US012122150B2

(12) United States Patent
Akiyama

(10) Patent No.: US 12,122,150 B2
(45) Date of Patent: Oct. 22, 2024

(54) RECORDING DEVICE

(71) Applicant: SEIKO EPSON CORPORATION, Tokyo (JP)

(72) Inventor: Taiki Akiyama, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 155 days.

(21) Appl. No.: 18/060,396

(22) Filed: Nov. 30, 2022

(65) Prior Publication Data

US 2023/0166536 A1 Jun. 1, 2023

(30) Foreign Application Priority Data

Dec. 1, 2021 (JP) ................................ 2021-195276

(51) Int. Cl.
*B41J 11/04* (2006.01)
*B65H 5/06* (2006.01)

(52) U.S. Cl.
CPC .............. *B41J 11/04* (2013.01); *B65H 5/062* (2013.01); *B65H 2404/147* (2013.01)

(58) Field of Classification Search
CPC .. B41J 3/60; B41J 11/04; B65H 5/062; B65H 5/38; B65H 29/12; B65H 29/52; B65H 85/00; B65H 2404/147; B65H 2404/1115
See application file for complete search history.

(56) References Cited

U.S. PATENT DOCUMENTS

2004/0165227 A1* 8/2004 Makino ................ H04N 1/1235 358/488
2021/0237481 A1 8/2021 Misawa et al.

FOREIGN PATENT DOCUMENTS

JP 2008254216 * 10/2008 ............. B41J 15/04
JP 2021-121556 A 8/2021

* cited by examiner

*Primary Examiner* — Anh T Vo
(74) *Attorney, Agent, or Firm* — WORKMAN NYDEGGER

(57) ABSTRACT

A recording device includes a recording unit configured to discharge liquid onto a medium to perform recording, a transport unit configured to transport the medium at a position facing the recording unit, a transport unit downstream roller pair located downstream the transport unit in a medium transport path and configured to transport the medium, a restricting roller being a roller configured to restrict movement of a medium back end region upstream the transport unit downstream roller pair in the medium transport path toward the recording unit side, and including a plurality of teeth along an outer periphery thereof, and a guide member being a member configured to support the restricting roller, and guiding the medium.

8 Claims, 3 Drawing Sheets

RECORDING DEVICE

The present application is based on, and claims priority from JP Application Serial Number 2021-195276, filed Dec. 1, 2021, the disclosure of which is hereby incorporated by reference herein in its entirety.

BACKGROUND

1. Technical Field

The present disclosure relates to a recording device that performs recording on a medium.

2. Related Art

In a recording device described in JP 2021-121556 A, a line head is provided at a position facing a transporting belt. A transport roller pair is provided downstream the transporting belt, and a medium transport path downstream thereof branches into a path heading for facedown emission and a path heading for switchback for double-sided recording.

When a medium is heading for the switchback path in the configuration described in JP 2021-121556 A, the medium curves so as to be convex toward the line head side at a site of the transport roller pair located downstream the transporting belt. Thus, when a back end region of the medium is released from adsorption by the transporting belt, the back end region easily springs up to the line head side. The spring-up of the back end region causes the back end region to strongly contact a guide member, and there is a possibility that ink is transferred to the guide member.

Further, the spring-up of the back end region can be suppressed by making a path downstream the transport roller pair located downstream the transporting belt linear, increasing a length of the path, and stabilizing medium posture, but in this case, the device becomes larger.

SUMMARY

In order to solve the problem described above, a recording device of the present disclosure includes a recording unit configured to discharge liquid onto a medium to perform recording, a transport unit configured to transport the medium at a position facing the recording unit, a transport unit downstream roller pair located downstream the transport unit in a medium transport direction and configured to transport the medium, a restricting roller being a roller configured to restrict movement of a medium back end region upstream the transport unit downstream roller pair in the medium transport direction toward the recording unit side, and including a plurality of teeth along an outer periphery thereof, and a guide member being a member configured to support the restricting roller, and guiding the medium.

DESCRIPTION OF EXEMPLARY EMBODIMENTS

Figure 1:
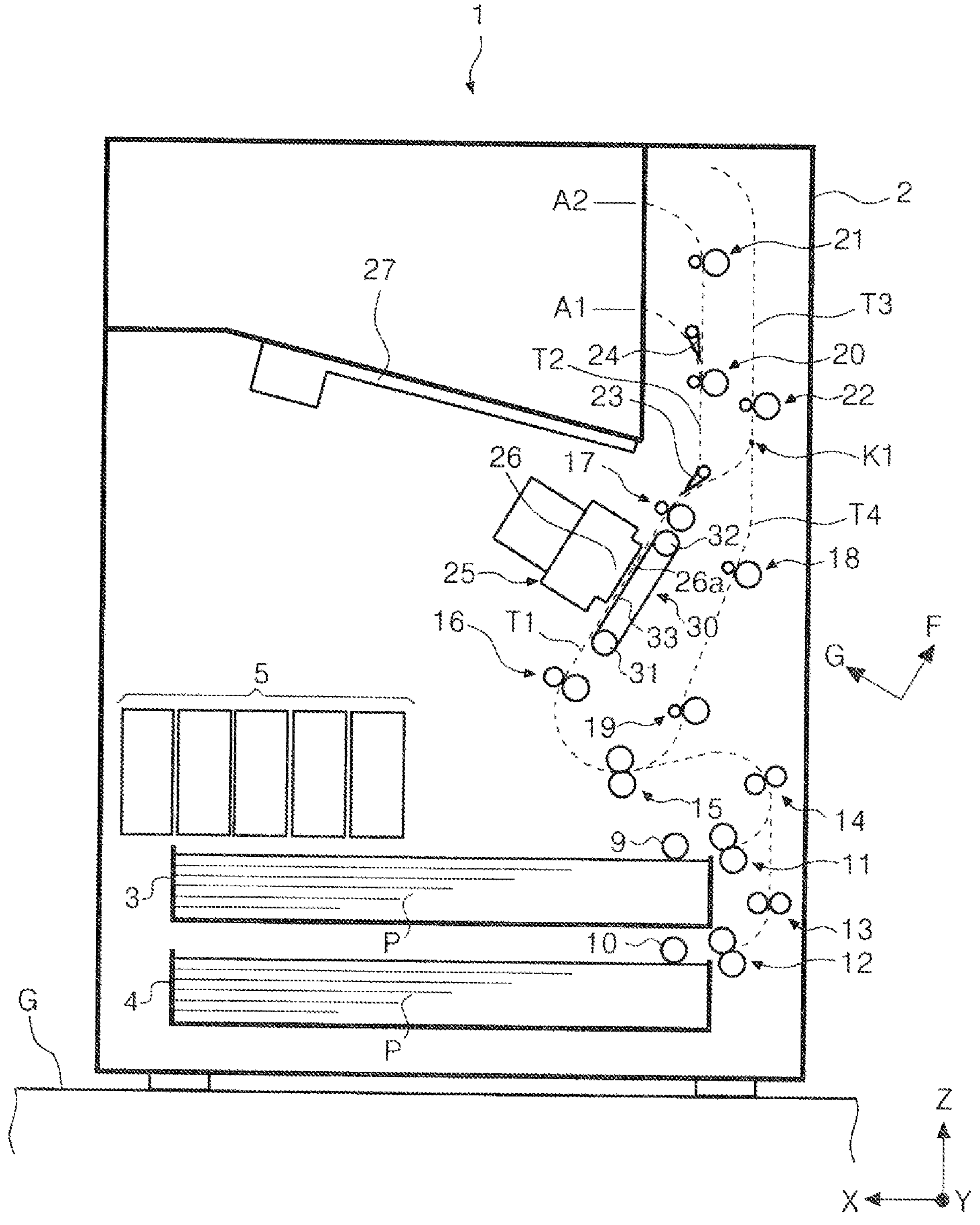
FIG. 1 is a diagram illustrating a medium transport path of a printer.

Hereinafter, the present disclosure will be schematically described.

A recording device according to a first aspect includes a recording unit configured to discharge liquid onto a medium to perform recording, a transport unit configured to transport the medium at a position facing the recording unit, a transport unit downstream roller pair located downstream the transport unit in a medium transport direction and configured to transport the medium, a restricting roller being a roller configured to restrict movement of a medium back end region upstream the transport unit downstream roller pair in the medium transport direction toward the recording unit side, and including a plurality of teeth along an outer periphery thereof, and a guide member being a member configured to support the restricting roller, and guiding the medium.

According to the present aspect, even when the medium back end region springs up upstream the transport unit downstream roller pair to the recording unit side, the medium back end region abuts on the restricting roller, and thus a transfer of liquid to the guide member can be suppressed. In addition, it is not necessary to extend a linear path for stabilizing medium posture downstream the transport unit downstream roller pair, and an increase in size of the device can be suppressed.

A second aspect is the first aspect, wherein the transport unit downstream roller pair includes a driven roller being a roller in contact with a most recently recorded surface of a medium, and driven to rotate, and a drive roller being a roller in contact with a surface opposite to the recorded surface, and driven, and a medium transport path downstream the transport unit downstream roller pair branches into a first medium transport path, and a second medium transport path curved, downstream of the transport unit downstream roller pair, toward the drive roller side.

According to the present aspect, since the medium transport path downstream the transport unit downstream roller pair branches into the first medium transport path and the second medium transport path heading downstream from the transport unit downstream roller pair and curving toward the drive roller side, spring-up toward the guide member toward the recording unit side is likely to occur when the medium is transported to the second medium transport path, but by the first embodiment described above, a transfer of the liquid to the guide member can be suppressed, and an increase in size of the device can be suppressed.

A third aspect is the second aspect, wherein the transport unit includes a first pulley, a second pulley located downstream in the medium transport direction of the first pulley, and a transporting belt hung over the first pulley and the second pulley, and transports the medium while adsorbing the medium with the transport belt.

According to the present aspect, in the configuration in which the transport unit transports the medium belt while adsorbing the medium with the transporting, the action effect of the second aspect described above can be obtained.

A fourth aspect is the third aspect, wherein the restricting roller contacts the medium back end region between a downstream end of a flat region where the transporting belt faces the recording unit and a nip position of the transport unit downstream roller pair in the medium transport direction.

According to the present aspect, the restricting roller contacts the medium back end region between the downstream end of the flat region where the transporting belt faces the recording unit and the nip position of the transport unit downstream roller pair in the medium transport direction, and thus contact of the medium back end region released from adsorption by the transporting belt with the guide member can be favorably suppressed.

A fifth aspect is the third or fourth aspect, wherein a part of the restricting roller overlaps the second pulley in the medium transport direction.

According to the present aspect, a part of the restricting roller overlaps the second pulley in the medium transport direction, and thus a position of the transport unit downstream roller pair can be brought closer to the second pulley or the transporting belt, and the device can be miniaturized.

A sixth aspect is any one of the third to fifth aspects, wherein the restricting roller is located on the recording unit side of a straight line linking the downstream end of the flat region where the transporting belt faces the recording unit, and the nip position of the transport unit downstream roller pair, when viewed from a width direction intersecting the medium transport direction.

According to the present aspect, the restricting roller is located on the recording unit side of the straight line linking the downstream end of the flat region where the transporting belt faces the recording unit, and the nip position of the transport unit downstream roller pair, when viewed from the width direction intersecting the medium transport direction, thus a configuration is obtained in which when passing through a position of the restricting roller, a tip of the medium is unlikely to contact the restricting roller. Since the tip of the medium does not contact the restricting roller when passing through the position of the restricting roller, the tip of the medium can smoothly pass through the position of the restricting roller.

A seventh aspect is any one of the second to sixth aspects, wherein the guide member supports the driven roller and the restricting roller.

According to the present aspect, since the guide member supports the driven roller and the restricting roller, a low cost of the device can be achieved as compared with a configuration in which the driven roller and the restricting roller are supported by separate members.

An eighth aspect is any one of the second to seventh aspects, wherein the guide member has, upstream thereof in the medium transport direction, a relief part for avoiding contact with a back end of the medium.

According to the present aspect, the guide member has the relief part for avoiding contact with the back end of the medium upstream in the medium transport direction, and thus the back end is unlikely to contact the guide member when the medium back end region springs up toward the recording unit side, and thus, a transfer of the liquid to the guide member can be further favorably suppressed.

The present disclosure will be specifically described below.

An ink jet printer 1 that performs recording by discharging liquid represented by ink on a medium represented by recording paper will be described below as an example of a recording device. In the following, the inkjet printer 1 is abbreviated as a printer 1.

An X-Y-Z coordinate system illustrated in each figure is an orthogonal coordinate system, and a Y-axis direction is a medium width direction that intersects a medium transport direction, and is a device depth direction. Note that, in the Y-axis direction, a +Y direction is defined as a direction heading from a front of the device toward a back of the device, and a −Y direction is defined as a direction heading from the back of the device toward the front of the device.

Additionally, an X-axis direction is a device width direction, and a +X direction, which is the direction in which an arrow faces when viewed from an operator of the printer 1, is a left side, and a −X direction is a right side. A Z-axis direction is a vertical direction or a device height direction, and a +Z direction, which is a direction in which an arrow faces, is an upward direction, and a −Z direction opposite thereto is a downward direction.

In addition, an F-axis direction is a direction parallel to an ink discharge surface 26*a*, and is the medium transport direction at a position facing the ink discharging surface 26*a*, a +F direction, which is a direction in which an arrow faces, is downstream in the transport direction, and a −F direction opposite thereto is upstream in the transport direction. Note that, a direction in which the medium is sent may be referred to as "downstream", and a direction opposite thereto may be referred to as "upstream". Also, a G-axis direction is a normal direction of the ink discharge surface 26*a* of the line head 26, and is a direction orthogonal to the F-axis direction.

Figure 2:
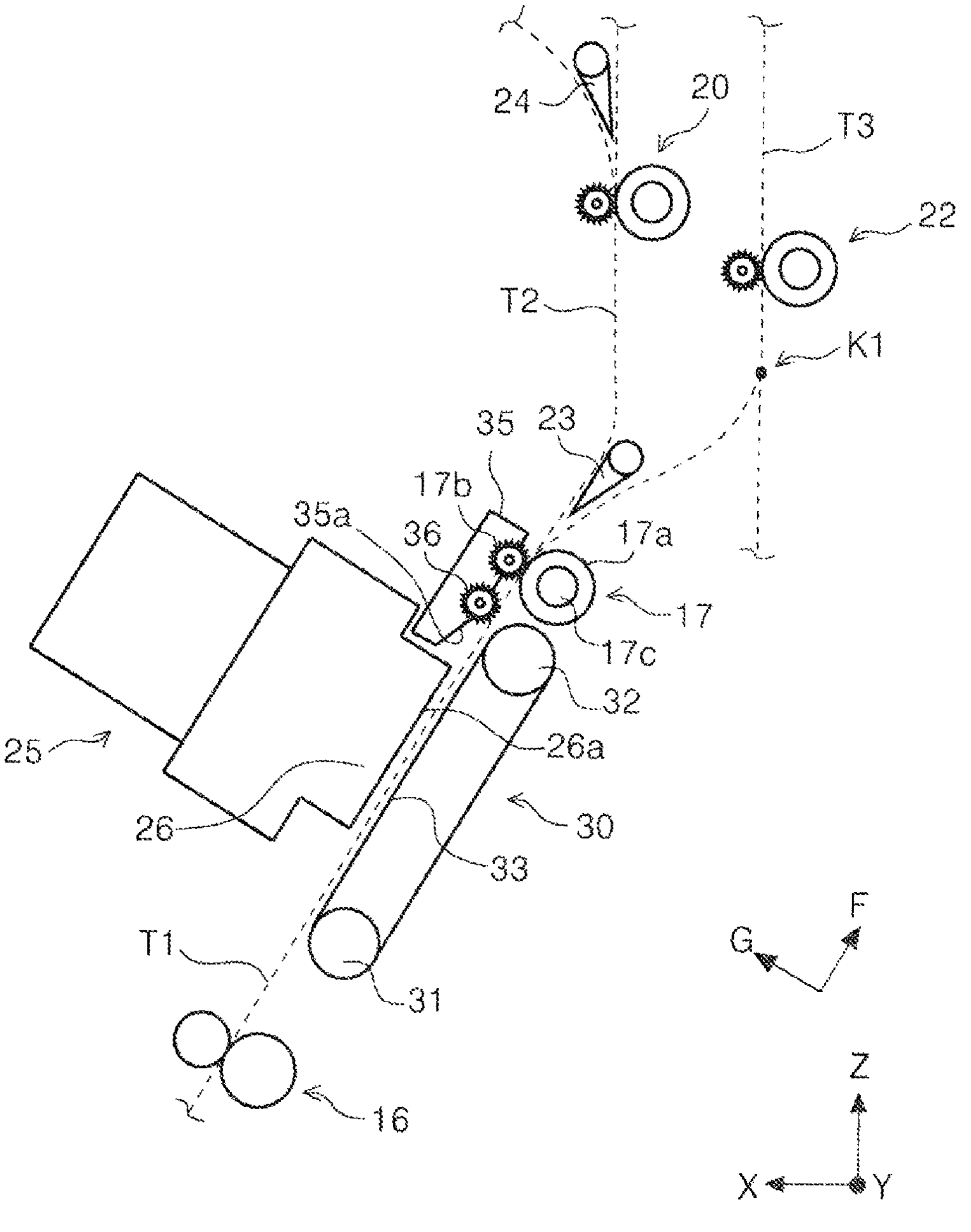
FIG. 2 is a diagram illustrating the medium transport path of the printer, and is a diagram illustrating an enlarged part of FIG. 1.

Also in each of FIG. 1 and FIG. 2, the medium transport path is indicated by a dashed line. In the printer 1, the medium is transported through the medium transport path indicated by the dashed line.

In FIG. 1, a device main body 2 of the printer 1 includes a first medium cassette 3 and a second medium cassette 4 that accommodate the media before feeding. A reference sign P denotes the medium accommodated in each medium cassette. The first medium cassette 3 and the second medium cassette 4 are detachably provided at the device body 2 from a front side of the device.

The first medium cassette 3 is provided with a pick roller 9 for feeding the accommodated medium, and the second medium cassette 4 is provided with a pick roller 10 for feeding the accommodated medium.

In addition, the first medium cassette 3 is provided with a feeding roller pair 11 that feeds the fed medium in an obliquely upward direction. Further, the second medium cassette 4 is provided with a feeding roller pair 12 that feeds the fed medium in an obliquely upward direction, and a transport roller pair 13 that transports the medium in the upward direction.

Note that, in the following, a "roller pair" includes a drive roller driven by a motor (not illustrated), and a driven roller that is driven to rotate in contact with the drive roller.

The medium fed from each medium cassette is sent to a transport roller pair 16 by a transport roller pair 14 and a transport roller pair 15. The medium that receives feed force from the transport roller pair 16 is sent to a position between the line head 26, which is an example of a recording unit, and the transporting belt 33, that is, a position facing the line head 26. Note that, hereinafter, the medium transport path from the transport roller pair 16 to the transport roller pair 17 is referred to as a "recording time transport path T1".

The line head 26 discharges ink onto a surface of the medium to perform recording. The line head 26 is an ink discharging head configured such that a nozzle (not illustrated) that discharges ink covers an entire region in the medium width direction, and is configured as an ink discharging head that can record on an entire region of the medium width without moving in the medium width direction.

However, the ink discharging head may be of a type that performs recording with movement in the medium width direction.

A reference numeral 5 denotes an ink accommodating unit that accommodates ink. The ink discharged from the line head 26 is supplied from the ink accommodating unit 5 to the line head 26 via a tube (not illustrated). The ink accommodating unit 5 is configured with a plurality of ink tanks disposed along the X-axis direction.

The transporting belt 33, the drive pulley 31, and the driven pulley 32 configure a belt unit 30. The belt unit 30 functions as a transport unit configured to transport the medium at the position facing the line head 26. The drive pulley 31 is an example of a first pulley, and the driven pulley 32 is an example of a second pulley located downstream in the medium transport direction of the drive pulley 31.

The transporting belt 33 is an endless belt that is hung over the drive pulley 31 and the driven pulley 32. The transporting belt 33 rotates by the drive pulley 31 being driven by a motor (not illustrated).

The transporting belt 33 is an endless belt formed of a base material made of urethane, rubber or the like containing a conductive material as necessary to adjust a resistance value, and is charged by being applied with voltage by a charging roller (not illustrated), thereby electrostatically adsorbing a medium.

Here, the recording time transport path T1 passing through the position facing the line head 26 intersects both a horizontal direction and the vertical direction, and is a configuration for transporting the medium in an obliquely upward direction. This obliquely upward transport direction is a direction including the −X direction component and the +Z direction component in FIG. 1, and with this configuration, a dimension in the horizontal direction of the printer 1 can be suppressed.

Note that, in the present embodiment, the recording time transport path T1 is set to an inclination angle in a range from 50° to 70° with respect to the horizontal direction, and more specifically, is set to an inclination angle of 60°.

The medium in which recording is performed on a first surface by the line head 26 is further sent in an obliquely upward direction by the transport roller pair 17 located in a vicinity downstream the transporting belt 33. Note that, in the following, the transport roller pair 17 is rephrased as the transport unit downstream roller pair 17.

A flap 23 is provided downstream the transport unit downstream roller pair 17, and the transport direction of the medium is switched by the flap 23. That is, the medium transport path branches into two paths downstream the transport unit downstream roller pair 17. Of these, one is a facedown emission path T2, and another is a switchback path T3.

When the medium after recording is performed is emitted as is, the medium transport path is switched to the facedown emission path T2 heading toward a transport roller pair 20 on an upper side by the flap 23. The facedown emission path T2 is a path downstream the transport unit downstream roller pair 17.

A flap 24 is further provided downstream the transport roller pair 20, and the transport path is switched by the flap 24 to either the path for facedown emission from an emission position A1, or the path for transport to a transport roller pair 21 located further vertically upward. When the medium is sent toward the transport roller pair 21, the facedown emission is performed from an emission position A2.

The medium emitted from the emission position A1 is received by an emission tray 27 that inclines in an obliquely upward direction including the +X direction component and the +Z direction component. The medium emitted from the emission position A2 is received by an optional tray (not illustrated).

When recording is further performed on a second surface in addition to the first surface of the medium, the medium transport path is sent to the switchback path T3 by the flap 23. In the present embodiment, the switchback path T3 is a path downstream the transport unit downstream roller pair 17.

The switchback path T3 is provided with the transport roller pair 22, the medium entering the switchback path T3 is transported upward by the transport roller pair 22, and after a back end of the medium passes through a branch position K1, a rotational direction of the transport roller pair 22 is switched, and thus, the medium is transported downward and enters an inversion path T4.

The inversion path T4 is coupled to the switchback path T3 at the branch position K1. In the present embodiment, the inversion path T4 is the medium transport path from the branch position K1 reaching the transport roller pair 16 through transport roller pairs 18, 19, and the transport roller pair 15.

The medium entering the inversion path T4 receives feeding force from the transport roller pair 18, the transport roller pair 19, and the transport roller pair 15, reaches the transport roller pair 16, and is again sent to the transporting belt 33 by the transport roller pair 16.

Again, in the medium sent to the position facing the line head 26, the second surface opposite to the first surface already subjected to recording faces the line head 26. This allows recording on the second surface of the medium by the line head 26. The medium after recording on the second surface is emitted from the emission position A1 or the emission position A2 described above.

Next, description will be further given for a configuration of a periphery of the transport unit downstream roller pair 17 with reference to FIG. 2. The transport unit downstream roller pair 17 is configured to include a drive roller **17*a* driven by a motor (not illustrated), and a driven roller 17*b* that is driven to rotate. The drive rollers 17*a* are rubber rollers provided at appropriate intervals along a shaft direction of a shaft 17*c* extending in the medium width direction, and contact a surface on a side opposite to a most recently recorded surface of the medium. The driven roller 17*b* is configured with a toothed roller having a plurality of teeth along an outer periphery thereof, and is disposed so as to face the drive roller 17*a*** along the medium width direction, and is driven to rotate in contact with the most recently recorded surface of the medium.

Note that, the most recently recorded surface of the medium is the first surface when recording is performed only on the first surface of the medium, and is the second surface when recording is performed on the second surface opposite to the first surface after recording is performed on the first surface of the medium.

Note that, the facedown emission path T2 is an example of a first medium transport path, and the switchback path T3 is an example of a second medium transport path curved, downstream of the transport unit downstream roller pair 17, toward the drive roller **17*a*** side.

The driven roller **17*b* is supported by a guide member 35. The guide member 35 is provided so as to extend along the medium width direction. The guide member 35** is formed of a resin material or a metal material, but a material or surface processing with which a transfer of ink is unlikely may be employed.

The guide member 35 guides the medium along a medium direction in the recording time transport path T1. In particular, a relief part 35*a* is formed upstream the guide member 35, and thus when a tip of the medium passes below the guide member 35, collision of the tip of the medium with the guide member 35 is suppressed.

A restricting roller 36 is provided upstream the driven roller 17*b* in the guide member 35. The restricting roller 36 is a toothed roller having a plurality of teeth along an outer periphery thereof, and is provided so as to be capable of being driven to rotate in contact with the medium. A plurality of the restricting rollers 36 are provided at appropriate intervals along the medium width direction, and in the present embodiment, a position of the restricting roller 36 in the medium width direction matches a position of the driven roller 17*b*. However, the position in the medium width direction of the restricting roller 36 may be a position between the two driven rollers 17*b*.

Note that, in FIG. 1, the guide member 35 and the restricting roller 36 are not illustrated.

Figure 3:
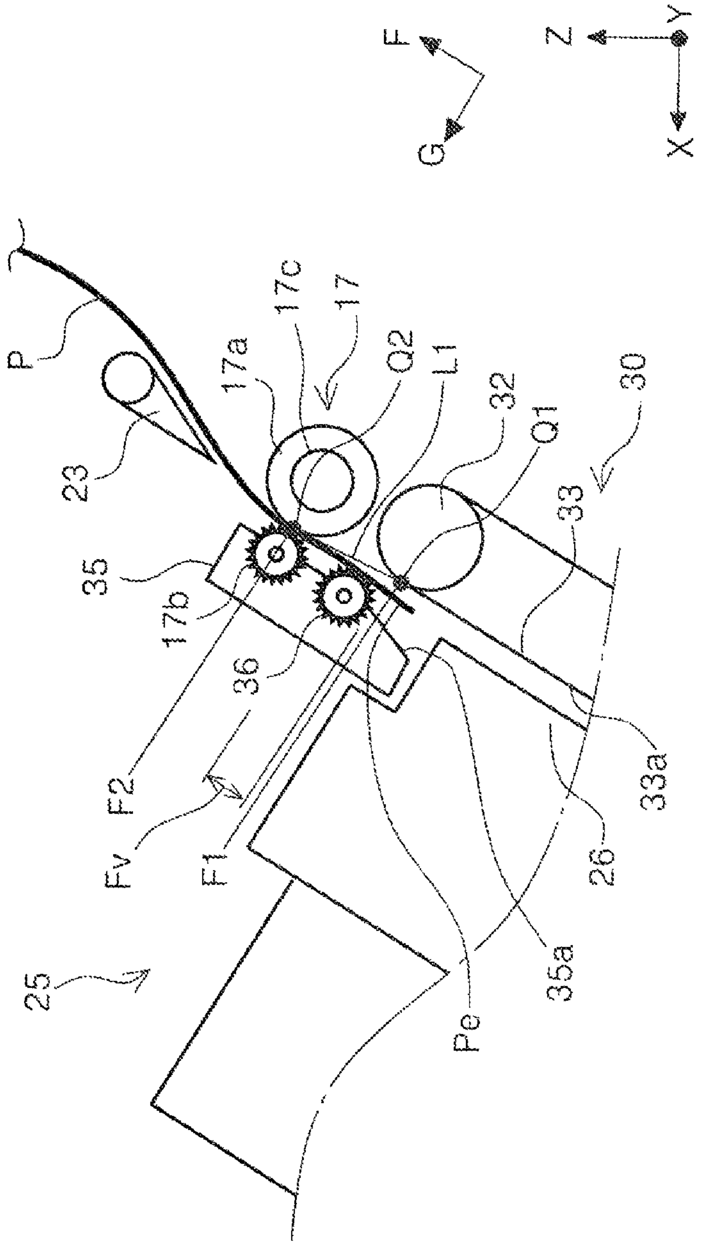
FIG. 3 is a diagram illustrating the medium transport path of the printer, and is a diagram illustrating an enlarged part of FIG. 2.

With reference to FIG. 3, the restricting roller 36 will be further described in detail below. The restricting roller 36 is a roller that restricts movement of a medium back end region Pe upstream the transport unit downstream roller pair 17 toward the line head 26 side (a +G direction). The restricting roller 36 protrudes in a −G direction from the guide member 35.

The reference sign P in FIG. 3 denotes the medium traveling to the switchback path T3. The switchback path T3 curves, downstream the transport unit downstream roller pair 17, toward the drive roller 17*a* side, and thus, the medium back end region Pe easily springs up toward the line head 26 side when released from adsorption by the transporting belt 33. When the medium back end region Pe springs up toward the line head 26 side, there is a possibility that the medium back end region Pe contacts the guide member 35 and a transfer of the ink occurs.

Further, the spring-up of the medium back end region Pe can be suppressed by making a path downstream the transport unit downstream roller pair 17 linear, increasing a length of the path, and stabilizing medium posture, but in this case, the device becomes larger.

However, as described above, the restricting roller 36 that restricts movement of the medium back end region Pe toward the line head 26 side (+G direction) is provided upstream the transport unit downstream roller pair 17. In addition, the restricting roller 36 is the toothed roller having the plurality of teeth along the outer periphery thereof, and thus a transfer of the ink to the guide member 35 can be suppressed. In addition, it is not necessary to extend the linear path for stabilizing the medium posture downstream the transport unit downstream roller pair 17, and an increase in size of the device can be suppressed.

Note that, the medium back end region Pe is a region including a back end (upstream end) of the medium, and having a predetermined length from the back end of the medium toward downstream. As an example, length in the transport direction of the medium back end region Pe can be defined as a length from the back end of the medium to a nip position F2 of the transport unit downstream roller pair 17 at timing at which the medium P is released from adsorption by the transporting belt 33 and is separated from the transporting belt 33. Alternatively, the length in the transport direction of the medium back end region Pe can be defined as a length from a downstream end position F1 of a flat region 33*a* of the transporting belt 33 to the nip position F2 of the transport unit downstream roller pair 17.

In addition, in the present embodiment, the restricting roller 36 is configured to contact the medium back end region Pe between the downstream end position F1 of the flat region 33*a* of the transporting belt 33 and the nip position F2 of the transport unit downstream roller pair 17. This makes it possible to favorably suppress contact of the medium back end region Pe released from adsorption by the transporting belt 33 with the guide member 35.

Furthermore, a part of the restricting roller 36 overlaps the driven pulley 32 in the medium transport direction. A range in which the part of the restricting roller 36 overlaps the driven pulley 32 in the medium transport direction is denoted by a reference sign Fv. With such a configuration, a position of the transport unit downstream roller pair 17 can be brought closer to the driven pulley 32 or the transporting belt 33, and the device can be miniaturized.

In addition, when viewed from the width direction intersecting the medium transport direction, the restricting roller 36 is located on the line head 26 side of a straight line L1 linking a downstream end Q1 of the flat region 33*a* where the transporting belt 33 faces the line head 26 and a nip position Q2 of the transport unit downstream roller pair 17. According to such a configuration, when passing through a position of the restricting roller 36, a tip of the medium P is unlikely to contact the restricting roller 36, and the tip of the medium P can smoothly pass through the position of the restricting roller 36.

Additionally, since the guide member 35 supports the driven roller 17*b* and the restricting roller 36, a low cost of the device can be achieved as compared with a configuration in which the driven roller 17*b* and the restricting roller 36 are supported by separate members.

Further, the guide member 35 has the relief part 35*a* upstream in the medium transport direction. Thus, when the medium back end region Pe springs up toward the line head 26 side, the medium back end region Pe is unlikely to contact the guide member 35, and thus it is possible to favorably suppress a transfer of the ink to the guide member 35. Note that in the present embodiment, the relief part 35*a* is formed as a C surface, but may be formed as an R surface.

The present disclosure is not intended to be limited to the aforementioned embodiments, and many variations are possible within the scope of the disclosure as described in the appended claims. It goes without saying that such variations also fall within the scope of the disclosure.

What is claimed is:

1. A recording device, comprising:

a recording unit configured to discharge liquid onto a medium to perform recording;

a transport unit configured to transport the medium at a position facing the recording unit;

a transport unit downstream roller pair located downstream the transport unit in a medium transport direction, and configured to transport the medium;

a restricting roller being a roller configured to restrict movement of a medium back end region upstream the transport unit downstream roller pair in the medium transport direction toward the recording unit side, and including a plurality of teeth along an outer periphery thereof; and a guide member being a member configured to support the restricting roller, and guiding the medium.

2. The recording device according to claim 1, wherein the transport unit downstream roller pair includes a driven roller being a roller in contact with a most recently recorded surface of the medium, and driven to rotate, and a drive roller being a roller in contact with a surface opposite to the recorded surface, and driven, and a medium transport path downstream the transport unit downstream roller pair branches into a first medium transport path, and a second medium transport path curved, downstream of the transport unit downstream roller pair, toward the drive roller side.

3. The recording device according to claim 2, wherein the transport unit includes a first pulley, a second pulley located downstream in the medium transport direction of the first pulley, and a transporting belt hung over the first pulley and the second pulley, and transports the medium while adsorbing the medium with the transport belt.

4. The recording device according to claim 3, wherein the restricting roller contacts the medium back end region between a downstream end of a flat region where the transporting belt faces the recording unit and a nip position of the transport unit downstream roller pair in the medium transport direction.

5. The recording device according to claim 3, wherein a part of the restricting roller overlaps the second pulley in the medium transport direction.

6. The recording device according to claim 3, wherein the restricting roller is located on the recording unit side of a straight line linking a downstream end of a flat region where the transporting belt faces the recording unit, and a nip position of the transport unit downstream roller pair, when viewed from a width direction intersecting the medium transport direction.

7. The recording device according to claim 2, wherein the guide member supports the driven roller and the restricting roller.

8. The recording device according to claim 2, wherein the guide member includes, upstream thereof in the medium transport direction, a relief part for avoiding contact with a back end of the medium.

* * * * *